US012609771B2

(12) United States Patent
Huang et al.

(10) Patent No.: US 12,609,771 B2
(45) Date of Patent: Apr. 21, 2026

(54) OPTICAL ANALOG-TO-DIGITAL CONVERTER

(71) Applicant: Taiwan Semiconductor Manufacturing Company, Ltd., Hsin-Chu (TW)

(72) Inventors: Tai-Chun Huang, New Taipei City (TW); Chewn-Pu Jou, Hsinchu (TW); Stefan Rusu, Sunnyvale, CA (US)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 270 days.

(21) Appl. No.: 18/351,883

(22) Filed: Jul. 13, 2023

(65) Prior Publication Data

US 2024/0291570 A1 Aug. 29, 2024

Related U.S. Application Data

(60) Provisional application No. 63/487,225, filed on Feb. 27, 2023.

(51) Int. Cl.
H04B 10/60 (2013.01)
H04B 1/00 (2006.01)

(52) U.S. Cl.
CPC ........... H04B 10/60 (2013.01); H04B 1/0003 (2013.01); H04B 1/0007 (2013.01); H04B 1/0028 (2013.01); H04B 2210/516 (2013.01)

(58) Field of Classification Search
None
See application file for complete search history.

(56) References Cited

U.S. PATENT DOCUMENTS

| | | | |
|---|---|---|---|
| 5,565,867 A | 10/1996 | Tiemann | |
| 10,374,701 B2 * | 8/2019 | Oda | H04B 10/07953 |
| 2002/0163454 A1 | 11/2002 | Yap et al. | |
| 2004/0018020 A1 * | 1/2004 | Chaput | H04B 10/299 |
| | | | 398/154 |
| 2012/0212360 A1 | 8/2012 | Kanter et al. | |
| 2016/0261340 A1 * | 9/2016 | Yang | H04B 10/07955 |

FOREIGN PATENT DOCUMENTS

TW I641231 B 11/2018

* cited by examiner

*Primary Examiner* — Darren E Wolf
(74) *Attorney, Agent, or Firm* — HAYNES AND BOONE, LLP

(57) ABSTRACT

An optical analog-to-digital converter (O-ADC) converts an input optical signal (IOS) into an output digital signal. The O-ADC includes ADC stages, each of which can generate an electrical bit of the output digital signal and an optical bit. An ADC stage can include a photodetector, an ADC circuit, and an optical output circuit. The photodetector generates an analog electrical signal based on a portion of the IOS. The ADC circuit generates a digital electrical signal (electrical bit) based on the analog electrical signal and a reference analog electrical signal, which is based on a portion of a reference optical signal (ROS). The optical output circuit provides an output optical signal (OOS) (optical bit) based on the digital electrical signal and the portion of the ROS. Photodetectors of subsequent ADC stages generate analog electrical signals based further on an OOS from an optical output circuit of a previous respective ADC stage.

20 Claims, 11 Drawing Sheets

OPTICAL ANALOG-TO-DIGITAL CONVERTER

This is a non-provisional application of and claims benefit of U.S. Provisional Patent Application Ser. No. 63/487,225, filed Feb. 27, 2023, the entire disclosure of which is incorporated herein by reference.

BACKGROUND

Photonic (optical) analog-to-digital conversion technology can overcome many limitations of electrical analog-to-digital conversion technology to provide data transmission and/or communication systems with faster speeds, greater bandwidths, and better accuracy. Although existing optical analog-to-digital conversion techniques have been generally adequate for their intended purposes, they have not been entirely satisfactory in all respects.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Figure 1:
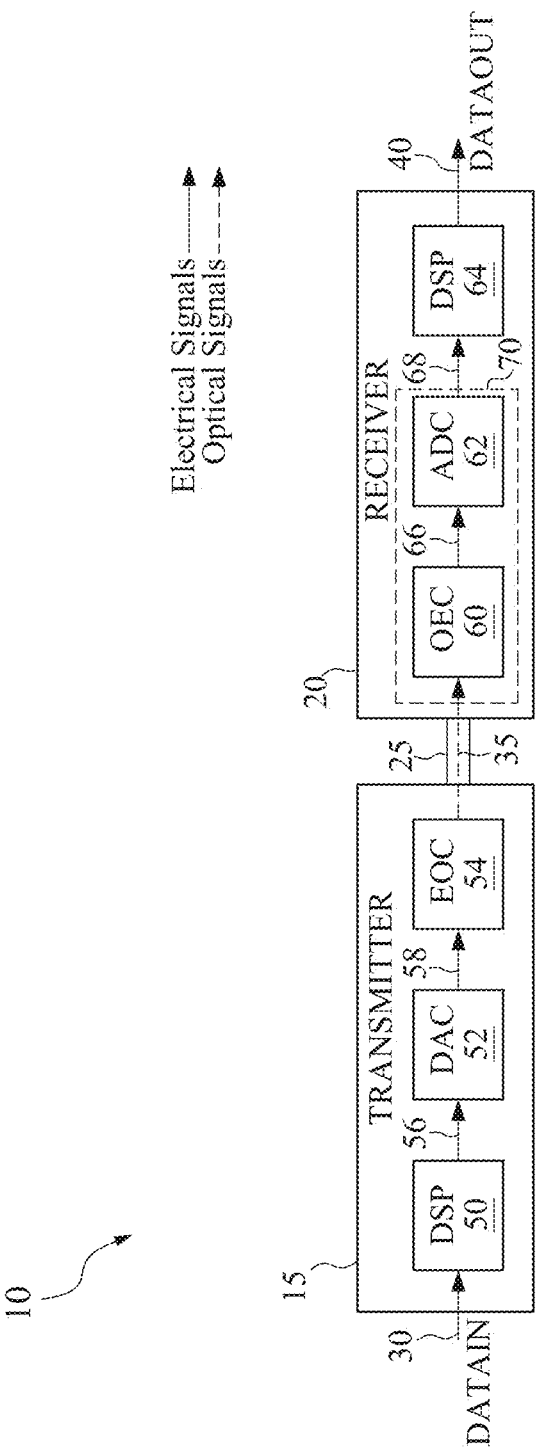
FIG. 1 is a block diagram of an optical communication system, in portion or entirety, according to various aspects of the present disclosure.

The present disclosure generally relates to optical data transmission, processing, and communication systems, and more particularly, to optical analog-to-digital converters thereof.

The following disclosure provides many different embodiments, or examples, for implementing different features of the invention. Specific examples of components and arrangements are described below to simplify the present disclosure. These are, of course, merely examples and are not intended to be limiting. The present disclosure may also repeat reference numerals and/or letters in the various examples. This repetition is for the purpose of simplicity and clarity and does not in itself dictate a relationship between the various embodiments and/or configurations discussed herein.

Optical analog-to-digital converters are disclosed herein for converting an input optical signal into a digital signal. As described herein, light energy of an input optical signal can be divided into different channels, where a kth bit of a digital signal is generated based on a portion of the light energy of the input optical signal. For example, a portion of the light energy undergoes photoelectric conversion through a photodetector to provide an input analog signal, which enters a comparator (or other analog-to-digital conversion circuit). The comparator compares the input analog signal with a reference analog signal that represents reference light energy having a $\frac{1}{2}^k$ signal level (in some instances, the light energy is of a maximum power signal) and outputs the kth bit of the digital signal. The digital signal can also be output to an optical output circuit (e.g., an optical switch and/or an optical multiplexer)(optionally further including error correction bits), which switches light (optical) energy to a given number of bits. The light energy can be converted from double-input optical energy into quantized energy through differential photodetectors. To generate a (k+1)th bit of a digital signal, a differential photodetector provides a next-stage input analog signal from a portion of the light energy of the input optical signal and light energy output by the optical output circuit, and a next-stage comparator compares the next-stage input analog signal with a reference analog signal that represents reference light energy having a $\frac{1}{2}^{k+1}$ signal level, and so on to generate additional bits. Optical signal bandwidth can be increased significantly as compared to electrical signal bandwidth using such technique. Optical analog-to-digital converters disclosed herein can facilitate photoelectric signal processing of n-bits, additional reading of optical signals, and reading/converting of optical signals of different intensities into electrical signals, which can improve optical signal processing efficiency. Details of improved optical ADCs and systems and/or components, such as optical receivers, including such are described herein.

FIG. 1 is a block diagram of an optical communication system 10, in portion or entirety, according to various aspects of the present disclosure. Optical communication system 10 is configured to optically transmit information (e.g., data, voice, image, audio, video, etc.). Optical communication system 10 includes a transmitter 15, a receiver 20, and a communication channel 25. Transmitter 15, receiver 20, and communication channel 25 are coupled in a manner (e.g., electrically, mechanically, communicatively, physically, other type of coupling, or a combination thereof) that facilitates optical transmission of information from transmitter 15 to receiver 20. Transmitter 15 converts electrical signals, such as a data signal 30 (e.g., input data), into optical signals, such as an optical signal 35, and launches the optical signals onto/into communication channel 25, which transports the optical signals to receiver 20. Receiver 20 converts optical signals, such as optical signal 35, into electrical signals, such as a data signal 40. Data signal 30 and data signal 40 can each be digital data/information streams, such as logical binary data streams (e.g., a data bit sequence including, for example, 0 s and/or 1 s), and optical signal 35 is the data/information represented in optical form. Communication channel 25 (also referred to as an optical transmission channel and/or an optical channel) can include optical fibers, waveguides (e.g., one or more silicon waveguides), other optical transmission media, or a combination thereof. In some embodiments, transmitter 15 and receiver 20 are part of a single photonic integrated circuit (PIC). In some embodiments, transmitter 15 and receiver 20 are parts of separate PICs. FIG. 1 has been simplified for the sake of clarity to better understand the inventive concepts of the present disclosure. Additional features can be added in optical communication system 10, and some of the features described below can be replaced, modified, or eliminated in other embodiments of optical communication system 10.

Transmitter 15 can include a digital signal processor (DSP) 50, a digital-to-analog converter (DAC) 52, and an electrical-to-optical converter (EOC) 54. DSP 50 receives information in digital form, such as data signal 30, processes the information, and generates digital electrical signals that represent the information, such as a digital signal 56. DAC 52 converts digital electrical signals, such as digital signal 56, into analog electrical signals, such as an analog signal 58. EOC 54 converts analog electrical signals, such as analog signal 58, into optical signals, such as optical signal 35. In some embodiments, DAC 52 and EOC 54 are collectively referred to as an optical DAC (O-DAC), where the optical DAC is configured to convert digital electrical signals (e.g., digital signal 56) into optical signals (e.g., optical signal 35). In some embodiments, transmitter 15 includes an electrical amplifier, such as an amplifier configured to amplify analog electrical signals, such as analog signal 58, before provided to EOC 54, and/or an optical amplifier, such as an amplifier configured to amplify optical signals, such as optical signal 35, before provided to communication channel 25.

Receiver 20 can include an optical-to-electrical converter (OEC) 60, an analog-to-digital converter (ADC) 62, and a digital signal processor (DSP) 64. OEC 60 converts optical signals, such as optical signal 35, into analog electrical signals, such as an analog signal 66. ADC 62 converts analog electrical signals, such as analog signal 66, into digital electrical signals, such as a digital signal 68. DSP 64 receives digital electrical signals that represent the information received from transmitter 48, such as digital signal 68, processes the digital electrical signals, and generates the information in digital form, such as data signal 40. In some embodiments, OEC 60 and ADC 62 are collectively referred to as an optical ADC (O-ADC) 70, where the optical ADC is configured to convert optical signals (e.g., optical signal 35) into digital electrical signals (e.g., digital signal 68). In some embodiments, receiver 20 includes an electrical amplifier, such as an amplifier configured to amplify analog electrical signals, such as analog signal 66, before provided to ADC 62, and/or an optical amplifier, such as an amplifier configured to amplify optical signals, such as optical signal 35, before provided to OEC 60.

Figure 2:
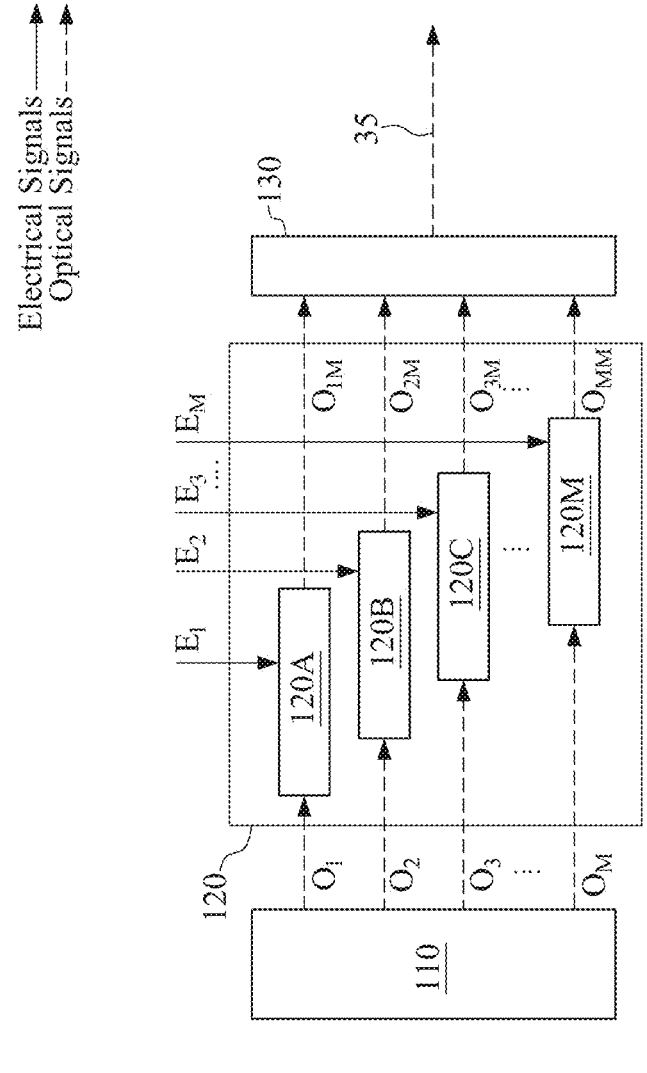
FIG. 2 is a block diagram of an optical transmitter, in portion or entirety, according to various aspects of the present disclosure.

FIG. 2 is a block diagram of an optical transmitter 100, in portion or entirety, according to various aspects of the present disclosure. Optical transmitter 100 can be implemented in optical communication system 10, such as implemented as transmitter 15 and/or a portion thereof. Optical transmitter 100 converts electrical signals (e.g., data signal 30) into optical signals (e.g., optical signal 35). Optical transmitter 100 includes an optical source 110, an electrical-to-optical modulator (EOM) 120, and an optical combiner 130. EOM 120 includes a modulator 120A, a modulator 120B, a modulator 120C, . . . to a modulator 120M, where M is a number of modulators of EOM 120. Optical source 110 (e.g., one or more lasers, light emitting diodes (LEDs), other optical sources, or a combination thereof) generate optical signals (e.g., incident light beams), such as an optical signal $O_1$, an optical signal $O_2$ . . . to an optical signal $O_M$. Optical signals $O_1$-$O_M$ may represent different signals transmitted in different wavelengths or bands, in a manner similar to wavelength-division multiplexing (WDM), to increase a transmission data rate by a factor of M. Modulators 120A-120M receive respective optical signals (e.g., optical signals $O_1$-$O_M$, respectively) from optical source 110 and modulate the respective optical signals based on respective electrical signals (e.g., electrical signals $E_1$-$E_M$, respectively), thereby generating respective optical signals (e.g., optical signals $O_{1M}$-$O_{MM}$, respectively). Optical signals $O_{1M}$-$O_{MM}$ are quantized optical signals. Optical combiner 130 combines optical signals (e.g., optical signals $O_{1M}$-$O_{MM}$) into a single optical signal for transmission, such as optical signal 35. Each of modulators 120A-120M can convert electrical signals into optical signals in a different channel (band). FIG. 2 has been simplified for the sake of clarity to better understand the inventive concepts of the present disclosure. Additional features can be added in optical transmitter 100, and some of the features described below can be replaced, modified, or eliminated in other embodiments of optical transmitter 100.

Figure 3:
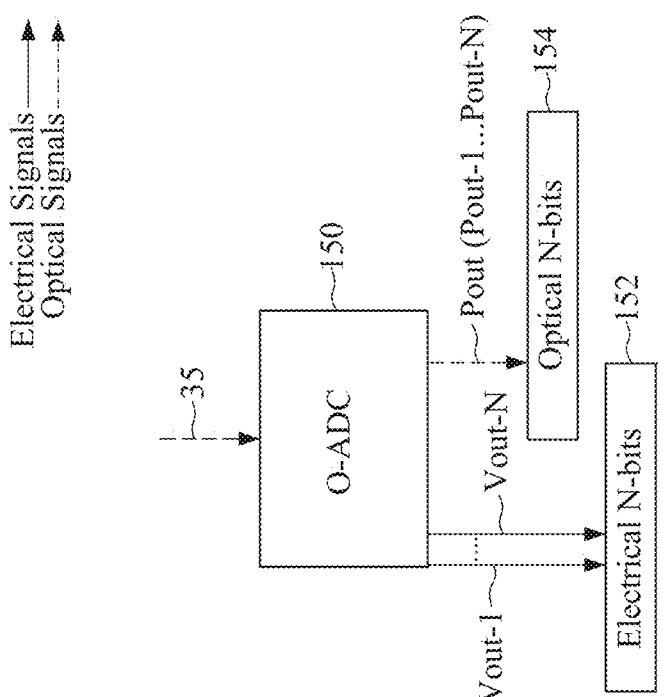
FIG. 3 is an abstract representation of an optical analog-to-digital converter, in portion or entirety, according to various aspects of the present disclosure.

FIG. 3 is an abstract representation of an optical ADC 150, in portion or entirety, according to various aspects of the present disclosure. Optical ADC 150 (also referred to as a photonic ADC) can be implemented in optical communication system 10, such as optical ADC 70 and/or portions thereof. Optical ADC 150 converts optical signals, such as optical signal 35, into digital electrical signals, such as a digital signal 152 having a number of electrical bits given by N, where N is an integer and N is greater than zero. In other words, optical ADC 150 is an N-bit optical ADC. For example, where N is equal to two, optical ADC 150 is a 2-bit optical ADC, and digital signal 152 is a 2-bit digital signal. Each electrical bit (e.g., a kth bit of optical ADC 150, where k is an integer and k=1, 2 . . . to N) is given and/or represented by a respective digital electrical signal, such as a respective voltage signal (e.g., $V_{out-1}$ . . . to $V_{out-N}$) output by optical ADC 150. Each voltage signal corresponds to a digital value, such as a logic "1" or a logic "0". Each voltage signal is generated by comparing a respective input analog signal (e.g., an input voltage) and a respective reference analog signal (e.g., a reference voltage). The respective input analog signal represents a signal level of optical signal 35, and the respective reference analog signal represents a signal level of a reference optical signal. In some embodiments, the input analog signal represents a portion of optical signal 35, and the signal level represented by the input analog signal is a portion of an input power (Pin) of optical signal 35. In some embodiments, the reference optical signal is an optical signal having maximum power ($P_{max}$) (referred to hereafter as a maximum power optical signal), the reference analog signal represents a portion of the maximum power optical signal, and the signal level represented by the reference analog signal is a portion of $P_{max}$, where $P_{max}$ is a maximum power that can be transmitted/received by optical communication system 10, such as a maximum output power of transmitter 15 (e.g., a maximum output power of an optical source thereof) and/or a maximum input power of receiver 20, of which optical ADC 150 can form a portion thereof.

Optical ADC 150 also provides an optical signal 154 having a number of optical bits given by N (e.g., optical signal 154 is a 2-bit optical signal). Each optical bit is given and/or represented by a respective optical signal, such as a respective optical signal (e.g., $P_{out-1}$ . . . to $P_{out-N}$) output by optical ADC 150, where the optical bits can be combined and transmitted together, such as by a same waveguide and/or other optical media. Each optical signal is based on a respective digital electrical signal (e.g., an input voltage) and a respective portion of the reference optical signal (e.g., a respective reference power). The respective portions of the reference optical signal used for providing the optical signals have different signal levels (e.g., different powers). In some embodiments, where the reference optical signal is a maximum power optical signal, each respective portion of the reference optical signal is a portion of $P_{max}$. In some embodiments, as described below, optical ADC 150 includes ADC stages, where each ADC stage provides an electrical bit of digital signal 152 and an optical bit of optical signal 154. In such embodiments, a (k+1)th electrical bit and a (k+1)th optical bit provided by a subsequent ADC stage is generated based on a kth optical bit (which depends on a kth electrical bit) of a respective previous ADC stage. In some embodiments, optical ADC 150 includes an electrical amplifier circuit and/or an optical amplifier circuit for amplifying electrical bits and optical bits, respectively. In some embodiments, specific electrical bits and/or specific optical bits (e.g., a kth bit) can be amplified as needed for detection and/or processing. FIG. 3 has been simplified for the sake of clarity to better understand the inventive concepts of the present disclosure. Additional features can be added in optical ADC 150, and some of the features described below can be replaced, modified, or eliminated in other embodiments of optical ADC 150.

Figure 4:
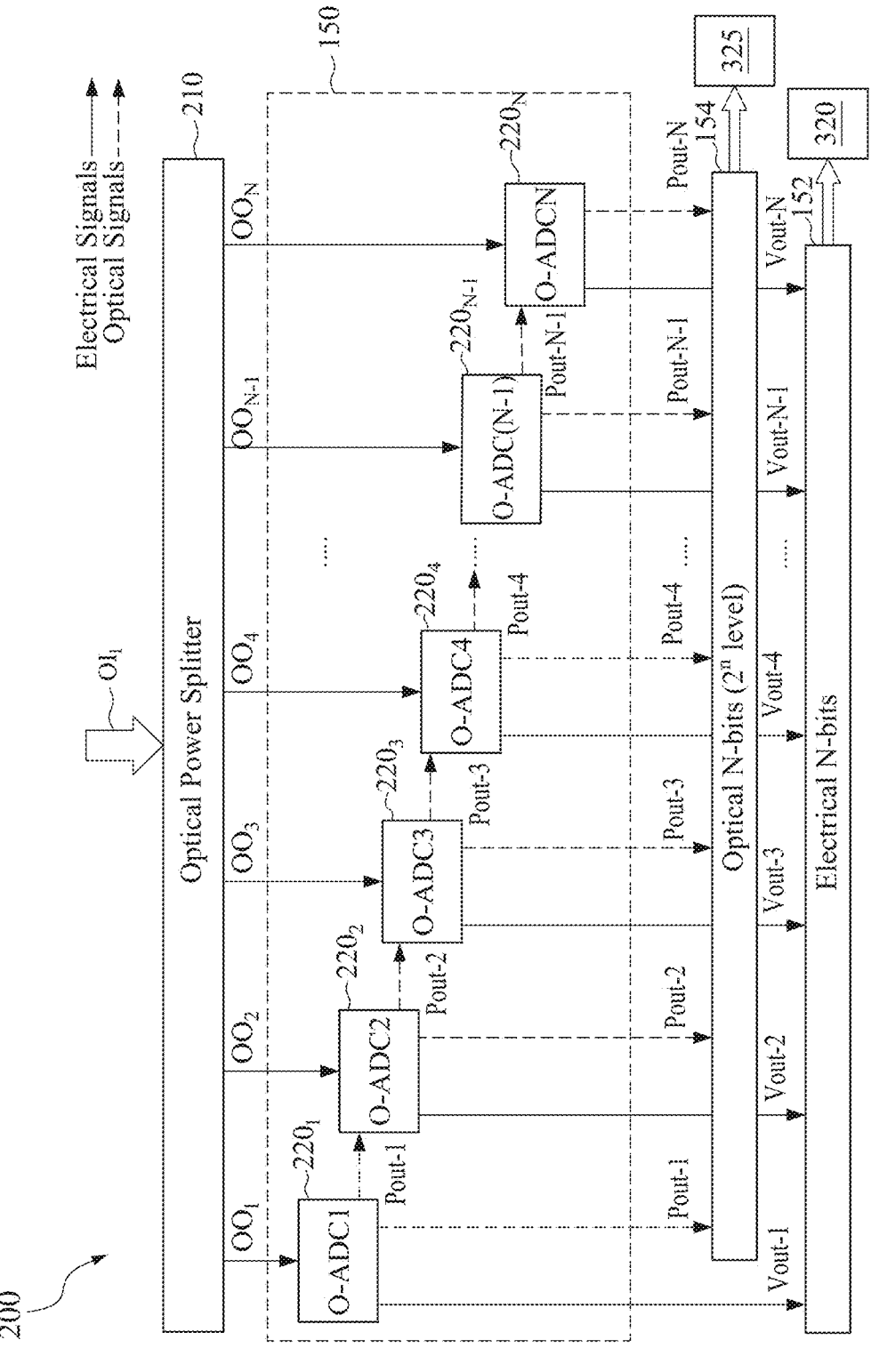
FIG. 4 is a block diagram of an optical receiver that includes an optical analog-to-digital converter, in portion or entirety, according to various aspects of the present disclosure.
Figure 5:
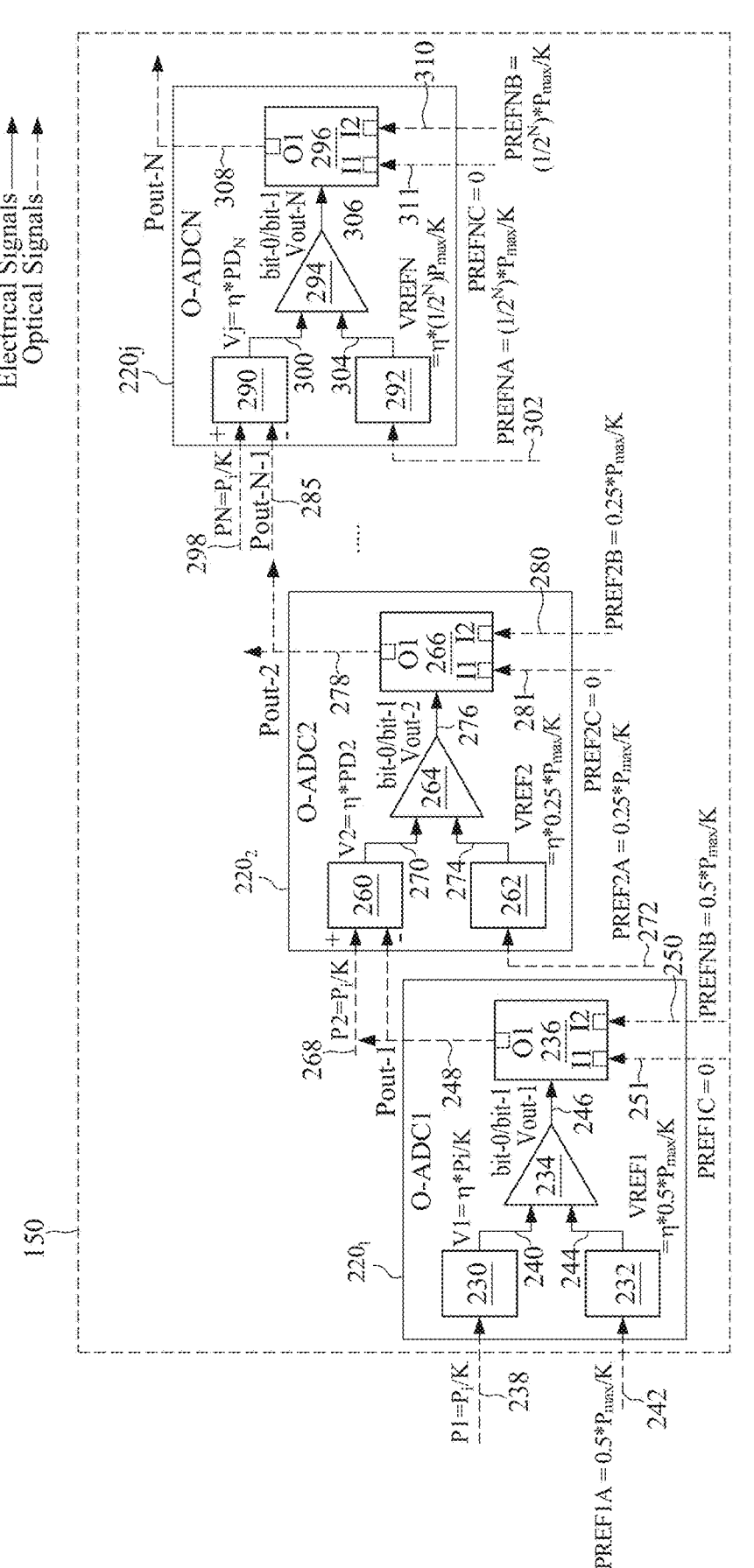
FIG. 5 is a block diagram of an optical analog-to-digital converter, in portion or entirety, according to various aspects of the present disclosure.

FIG. 4 is a block diagram of an optical receiver 200, in portion or entirety, that includes optical ADC 150, in portion or entirety, according to various aspects of the present disclosure. FIG. 5 is a block diagram of optical ADC 150, in portion or entirety, according to various aspects of the present disclosure. Optical receiver 200 of FIG. 4 can be implemented in optical communication system 10, such as implemented as receiver 20 and/or a portion thereof, and optical ADC 150 of FIG. 4 and FIG. 5 can be implemented in optical communication system 10, such as implemented as optical ADC 70 and/or a portion thereof. Optical receiver 200 converts optical signals (e.g., optical signal 35) into electrical signals (e.g., data signal 40). FIG. 4 and FIG. 5 have been simplified for the sake of clarity to better understand the inventive concepts of the present disclosure. Additional features can be added in optical receiver 200 and/or optical ADC 150, and some of the features described below can be replaced, modified, or eliminated in other embodiments of optical receiver 200 and/or optical ADC 150.

In FIG. 4 and FIG. 5, optical receiver 200 includes an optical power splitter 210 that divides optical power into multiple channels. For example, optical power splitter 210 receives an incident light beam (e.g., an optical input signal $OI_1$, such as optical signal 35) and splits (separates) the incident light beam into multiple output light beams, such as an optical output signal $OO_1$, an optical output signal $OO_2$, an optical output signal $OO_3$, an optical output signal $OO_4$ . . . to an optical output signal $OO_{N-1}$, and an optical output signal $OO_N$, where N is a number of channels of optical power splitter 210, N is an integer, and N is greater than zero. In such example, optical power splitter 210 can be referred to as a 1:N splitter. Optical power splitter 210 can receive optical input signal $OI_1$ from communication channel 25, such as from a waveguide forming communication channel 25 or portion thereof. In some embodiments, optical power splitter 210 can receive optical input signal $OI_1$ from a demultiplexer, such as a demultiplexer between communication channel 25 and receiver 20. In such embodiments, optical signal 35 can include optical signals having different wavelengths, and optical input signal $OI_1$ can be a portion of optical signal 35 having a given wavelength.

An input power ($P_i$) of optical input signal $OI_1$ is greater than 0 and less than a maximum power ($P_{max}$) of a maximum power optical signal (i.e., $0<P_i<P_{max}$), and a power of each optical output signal (i.e., powers of optical output signals $OO_1$-$OO_N$) is less than $P_i$ of optical input signal $OI_1$. In the depicted embodiment, optical power splitter 210 equally splits power of optical input signal $OI_1$, such that a power of each of optical output signals $OO_1$-$OO_N$ is $P_i/N$. In some embodiments, optical power splitter 210 unevenly splits power of optical input signal $OI_1$, such as according to a different power split ratio to provide optical output signals $OO_1$-$OO_N$ with different power. In some embodiments, some of optical output signals $OO_1$-$OO_N$ have the same power, while some of optical output signals $OO_1$-$OO_N$ have different power. In some embodiments, $P_{max}$ is a predefined maximum power of an optical signal that can be transmitted/received by optical communication system 10, a predefined maximum output power of transmitter 15 (e.g., a maximum output power of an optical source thereof), a predefined maximum input power of receiver 20/optical receiver 200, a predefined maximum input power of optical ADC 150, etc. In some embodiments, $P_{max}$ is a maximum power of an optical signal transmitted/received by optical communication system 10, a maximum output power of transmitter 15 (e.g., a maximum output power of an optical source thereof), a maximum input power of receiver 20/optical receiver 200, a maximum input power of optical ADC 150, etc.

In FIG. 4 and FIG. 5, optical ADC 150 includes a cascade of optical ADCs, such as an optical ADC $220_1$ (O-ADC1), an optical ADC $220_2$ (O-ADC2), an optical ADC $220_3$ (O-ADC3), an optical ADC $220_4$ (O-ADC4), . . . to an optical ADC $220_{N-1}$ (O-ADC(N−1)), and an optical ADC $220_N$ (O-ADCN). Optical ADCs $220_1$-$220_N$ generate digital electrical signals (e.g., $V_{out-1}$-$V_{out-N}$, respectively) based on optical output signals $OO_1$-$OO_N$, respectively. Optical ADCs $220_1$-$220_N$ further provide optical signals (e.g., $P_{out-1}$-$P_{out-N}$, respectively) based on digital electrical signals (e.g., $V_{out-1}$-$V_{out-N}$, respectively) and respective optical reference signals. In the depicted embodiment, optical ADCs $220_1$-$220_N$ are one-bit ADCs, where each of optical ADCs $220_1$-$220_N$ converts a respective optical signal (e.g., optical output signals $OO_1$-$OO_N$, respectively) into a respective one-bit digital electrical signal (e.g., $V_{out-1}$-$V_{out-N}$, respectively), and each of optical ADCs $220_1$-$220_N$ produces a respective one-bit optical signal (e.g., $P_{out-1}$-$P_{out-N}$, respectively) based on a respective one-bit digital electrical signal (e.g., $V_{out-1}$-$V_{out-N}$, respectively). In such embodiments, a number of O-ADCs of optical ADC 150 is equal to a number of bits of digital signal 152, and a number of channels of optical power splitter 210 is equal to a number of O-ADCs of optical ADC 150. As described below, in optical ADC 150, a subsequent ADC stage generates its digital electrical signal based on an optical bit of a preceding ADC stage. For example, optical ADC $220_2$ generates its digital electrical signal $V_{out-2}$ based on optical output signal $OO_2$ and optical signal $P_{out-1}$ provided by optical ADC $220_1$ (which is provided based on digital electrical signal $V_{out-1}$ (and thus optical output signal $OO_1$)) and a respective reference optical signal, and so on. A magnitude can decrease as ADC stage increases. For example, a signal level of a reference optical signal used by optical ADC $220_1$ to produce optical signal $P_{out-1}$ may be greater than a signal level of a reference optical signal used by optical ADC $220_2$ to produce optical signal $P_{out-2}$, and so on for subsequent optical ADCs.

In FIG. 5, optical ADC $220_1$ (i.e., a first optical analog-to-digital conversion stage) includes a photodetector 230, a photodetector 232, a comparator 234, and an optical switch 236. Photodetector 230 converts an optical signal 238 into an analog signal 240, which represents a signal level of optical input signal $OI_1$. For example, optical signal 238 (e.g., P1) is optical output signal $OO_1$ (i.e., a portion of optical input signal $OI_1$) having a power signal level (e.g., a power given by $P_t/K$), which is converted into analog signal 240. Analog signal 240 (e.g., V1) has a voltage signal level based on the power signal level (e.g., $V1=\eta*PD1=\eta*(P_t/K)$), where $\eta$ is an optical-to-electrical conversion efficiency (also referred to as a quantum efficiency) of a photodetector, and PD1 is a power signal level of optical signal 338).

Photodetector 232 converts an optical signal 242 into an analog signal 244, which represents a signal level of a reference optical signal. For example, optical signal 242 (e.g., PREF1A) is a reference optical signal having a reference power signal level that is less than $P_{max}$, such as a power given by $(\frac{1}{2}^k)*((P_{max}-P_{min})/K)$. Where $P_{min}=0$ and k=1 (i.e., where ADC $220_1$ provides a $1^{st}$ electrical bit of digital signal 152), optical signal 242 has a power given by $0.5*(P_{max}/K)$, which is converted into analog signal 244. Analog signal 244 (e.g., VREF1) has a voltage signal level based on the reference power signal level (e.g., $VREF1=\eta*0.5*(P_{max}/K)$). In such example, optical signal 242 is a portion of a maximum power optical signal.

Comparator 234 is coupled to photodetector 230, photodetector 232, and optical switch 236. Comparator 234 generates a digital signal 246 (e.g., $V_{out-1}$) by comparing analog signal 240 and analog signal 244. In other words, an optical signal is converted into a digital signal by comparing a power of a portion of an input optical signal (e.g., $P_t/K$) and a power of a reference optical signal, such as a portion of a maximum power optical signal (e.g., $0.5*P_{max}/K$). Digital signal 246 provides a k-th electrical bit of digital signal 152 generated/output by optical ADC 150. Since optical ADC $220_1$ is a first stage of optical ADC 150, k=1, and digital signal 246 provides a $1^{st}$ electrical bit of digital signal 152. Comparator 234 also provides digital signal 246 to optical switch 236, which generates an optical signal 248 (e.g., $P_{out-1}$).

Optical signal 248 provides a kth optical bit of optical signal 154 generated/output by optical ADC 150. Since optical ADC $220_1$ is a first stage of optical ADC 150 and k=1, optical signal 248 provides a $1^{st}$ optical bit of optical signal 154. In some embodiments, optical signal 248 may be combined with an optical power splitter for splitting. Optical signal 248 is generated based on digital signal 246, an optical signal 250, and an optical signal 251. For example, optical switch 236 receives optical signal 250 on an input port (I1) and optical signal 251 on an input port (I2) and modulates optical signal 250 and/or optical signal 251 based on digital signal 246 (e.g., $V_{out-1}$) to generate optical signal 248, which is transmitted to an output port (O1). In some embodiments, optical switch 236 is a 2×1 optical switch. Optical signal 250 (e.g., PREF1B) is a reference optical signal having a reference power signal level that is less than $P_{max}$. For example, optical signal 250 is a portion of a maximum power optical signal, such as an optical signal having a power given by $(\frac{1}{2}^k)*((P_{max}-P_{min})/K)$. Here, where k=1 and $P_{min}=0$, optical signal 250 has a power given by $0.5*(P_{max}/K)$. Optical signal 251 (e.g., PREF1C) is a reference optical signal having a reference power signal equal to zero. Since optical signal 248 is generated based on digital signal 246, optical signal 250, and optical signal 251, optical signal 248 has a power that depends on digital signal 246, optical signal 250, optical signal 251, or a combination thereof. For example, digital signal 246 may vary an amplitude, frequency, phase, polarization, or a combination thereof of optical signal 250 and/or optical signal 251. For example, a power of optical signal 248 (e.g., $P_{out-1}$) may be given by $V_{out-1}*0.5*(P_{max}/K)$. In some embodiments, a power of optical signal 250 is the same as a power of optical signal 242. In such embodiments, optical signal 250 can be the same as optical signal 242 (e.g., the same light beam can be input into photodetector 232 and optical switch 236). In some embodiments, a power of optical signal 250 is different than a power of optical signal 242.

Optical ADC $220_2$ (i.e., a second optical analog-to-digital conversion stage) includes a differential photodetector 260, a photodetector 262, a comparator 264, and an optical switch 266. Differential photodetector 260 converts an optical signal 268 and optical signal 248 (received from optical ADC $220_1$) into an analog signal 270, which represents a signal level of optical input signal $OI_1$. For example, optical signal 268 is optical output signal $OO_2$ having a power signal level that depends on optical input signal $OI_1$, optical signal 248 (e.g., $P_{out-1}$) is an optical signal having a power signal level that depends on digital signal 246 (which represents a power signal level of optical output signal $OO_1$ (which depends on optical input signal $OI_1$)), and analog signal 270 (e.g., V2) has a voltage signal level based on the power signal levels. Where optical signal 268 has a power given by $P_t/K$ and optical signal 248 has a power given by $V_{out-1}*0.5*(P_{max}/K)$, analog signal 270 (e.g., V2) has a voltage signal level based on a difference in power of optical signal 268 and a power of optical signal 248 (e.g., $V2=\eta*PD2=\eta*((P_t/K)-(V_{out-1}*0.5*(P_{max}/K)))$, where PD2 is a power signal level of an optical signal representative of a difference in power of optical signal 268 and power of optical signal 248).

Photodetector 262 converts an optical signal 272 into an analog signal 274, which represents a signal level of a reference optical signal. For example, optical signal 272 (e.g., PREF2A) is a reference optical signal having a reference power signal level that is less than $P_{max}$ and less than a reference power signal level of a reference optical signal of a preceding analog-to-digital conversion stage (e.g., the reference power signal level of PREF2A is less than the reference power signal level of PREF1A). Where optical signal 272 has a power given by $(\frac{1}{2}^k)*((P_{max}-P_{min})/K)$, $P_{min}=0$, and k=2, optical signal 272 has a power given by $0.25*(P_{max}/K)$, which is converted into analog signal 274. Analog signal 274 (e.g., VREF2) has a voltage signal level based on the reference power signal level (e.g., $VREF2=\eta*0.25*(P_{max}/K)$), which is less that the voltage signal level of analog signal 244. Similar to optical signal 242, optical signal 272 is a portion of the maximum power optical signal.

Comparator 264 is coupled to differential photodetector 260, photodetector 262, and optical switch 266. Comparator 264 generates a digital signal 276 (e.g., $V_{out-2}$) by comparing analog signal 270 and analog signal 274. In other words, an optical signal is converted into a digital signal by comparing a power of a portion of an input optical signal (e.g., $(P_t/K)-(V_{out-1}*0.5*(P_{max}/K))$) and a power of a reference optical signal, such as a portion of a maximum power optical signal (e.g., $0.25*P_{max}/K$). Comparator 264 also provides digital signal 276 to optical switch 266, which generates an optical signal 278 (e.g., $P_{out-2}$). Digital signal 276 provides a k-th electrical bit of digital signal 152 generated/output by optical ADC 150, and optical signal 278 provides a k-th optical bit of optical signal 154 generated/output by optical ADC 150. Since optical ADC 220$_2$ is a second stage of optical ADC 150 and k=2, digital signal 276 and optical signal 278 provide $2^{nd}$ bits of digital signal 152 and optical signal 154, respectively.

Optical signal 278 is generated based on digital signal 276, an optical signal 280, and an optical signal 281. For example, optical switch 266 receives optical signal 280 on an input port (I1) and optical signal 281 on an input port (I2) and modulates optical signal 280 and/or optical signal 281 based on digital signal 276 (e.g., $V_{out-2}$) to generate optical signal 278, which is transmitted to an output port (O1). In some embodiments, optical switch 266 is a 2×1 optical switch. Optical signal 280 (e.g., PREF2B) is a reference optical signal having a reference power signal level that is less than $P_{max}$ and less than a reference power signal level of a reference optical signal of its preceding analog-to-digital conversion stage (e.g., the reference power signal level of PREF2B is less than the reference power signal level of PREF1B). For example, optical signal 280 is a portion of a maximum power optical signal, such as an optical signal having a power given by $(\frac{1}{2}^k)*((P_{max}-P_{min})/K)$. Here, where k=2 and $P_{min}=0$, optical signal 280 has a power given by $0.25*(P_{max}/K)$. Optical signal 281 (e.g., PREF2C) is a reference optical signal having a reference power signal equal to zero. Since optical signal 278 is generated based on digital signal 276, optical signal 280, and optical signal 281, optical signal 278 has a power that depends on digital signal 276, optical signal 280, optical signal 281, or a combination thereof. For example, digital signal 276 may vary an amplitude, frequency, phase, polarization, or a combination thereof of optical signal 280 and/or optical signal 281. For example, a power of optical signal 278 (e.g., $P_{out-2}$) can be given by $V_{out-2}*0.25*(P_{max}/K)$. In some embodiments, a power of optical signal 280 is the same as a power of optical signal 272 (e.g., PREF2A=PREF2B). In such embodiments, optical signal 280 can be the same as optical signal 272 (e.g., the same light beam can be input into photodetector 262 and optical switch 266). In some embodiments, a power of optical signal 280 is different than a power of optical signal 272.

Optical ADC 220$_N$ (i.e., a last optical analog-to-digital conversion stage) includes a differential photodetector 290, a photodetector 292, a comparator 294, and an optical switch 296. Differential photodetector 290 converts an optical signal 298 and an optical signal 285 (received from optical ADC 220$_{N-1}$) into an analog signal 300, which represents a signal level of optical input signal $OI_1$. For example, optical signal 298 is optical output signal $OO_N$ having a power signal level that depends on optical input signal $OI_1$, optical signal 285 (e.g., $P_{out-N-1}$) is an optical signal having a power signal level that depends on a digital signal generated by optical ADC 220$_{N-1}$ (which represents a power signal level of optical output signal $OO_{N-1}$ (which depends on optical input signal $OI_1$)), and analog signal 300 (e.g., Vj) has a voltage signal level based on the power signal levels. Where optical signal 298 has a power given by $P_j/K$ and optical signal 285 has a power given by $V_{out-N-1}*2^{N-1}*(P_{max}/K)$, analog signal 300 has a voltage signal level based on a difference in power of optical signal 298 and a power of optical signal 285 (e.g., $Vj=\eta*PDj=1*((P_j/K)-(V_{out-N-1}*2^{N-1}*(P_{max}/K))$, where PDj is a power signal level of an optical signal representative of a difference in power of optical signal 298 and power of optical signal 285).

Photodetector 292 converts an optical signal 302 into an analog signal 304, which represents a signal level of a reference optical signal. For example, optical signal 302 (e.g., PREFjA) is a reference optical signal having a reference power signal level that is less than $P_{max}$ and less than a reference power signal level of a reference optical signal of a preceding analog-to-digital conversion stage, such as optical ADC 220$_{N-1}$ (e.g., the reference power signal level of PREFjA is less than the reference power signal level of PREF(N−1)A). Where optical signal 302 has a power given by $(\frac{1}{2}^k)*((P_{max}-P_{min})/K)$, $P_{min}=0$, and k=N, optical signal 302 has a power given by $(\frac{1}{2}^N)*(P_{max}/K)$, which is converted into analog signal 304. Analog signal 304 (e.g., VREFj) has a voltage signal level based on the reference power signal level (e.g., $VREFj=\eta*(\frac{1}{2}^N)*(P_{max}/K)$). Similar to optical signal 242 and optical signal 272, optical signal 302 is a portion of a maximum power optical signal but with a different signal level (i.e. power).

Comparator 294 is coupled to differential photodetector 290, photodetector 292, and optical switch 296. Comparator 294 generates a digital signal 306 (e.g., $V_{out-N}$) by comparing analog signal 300 and analog signal 304. In other words, an optical signal is converted into a digital signal by comparing a power of a portion of an input optical signal (e.g., $(P_j/K)-(V_{out-N-1}*2^{N-1}*(P_{max}/K))$ and a power of a reference optical signal, such as a portion of a maximum power optical signal (e.g., $(\frac{1}{2}^N)*(P_{max}/K)$). Comparator 294 can also provide digital signal 306 to optical switch 296, which can generate an optical signal 308 (e.g., $P_{out-N}$). Digital signal 306 provides a k-th electrical bit of digital signal 152 generated/output by optical ADC 150, and optical signal 308 provides a k-th optical bit of optical signal 154 generated/output by optical ADC 150. Since optical ADC 220$_N$ is a last stage and k=N, digital signal 306 and optical signal 308 provide $N^{th}$ bits of digital signal 152 and optical signal 154, respectively.

Optical signal 308 is generated based on digital signal 306, an optical signal 310, and an optical signal 311. For example, optical switch 296 receives optical signal 310 on an input port (I1) and optical signal 311 on an input port (I2) and modulates optical signal 310 and/or optical signal 311 based on digital signal 306 (e.g., $V_{out-N}$) to generate optical signal 308, which is transmitted to an output port (O1). In some embodiments, optical switch 306 is a 2×1 optical switch. Optical signal 310 (e.g., PREFNB) is a reference optical signal having a reference power signal level that is less than $P_{max}$ and less than a reference power signal level of a reference optical signal of a preceding analog-to-digital conversion stage (e.g., the reference power signal level of PREFNB is less than the reference power signal level of PREF(N−1)B). For example, optical signal 310 is a portion of a maximum power optical signal, such as an optical signal having a power given by $(\frac{1}{2}^k)*((P_{max}-P_{min})/K)$. Where k=N and $P_{min}=0$, optical signal 310 has a power given by $(\frac{1}{2}^N)*(P_{max}/K)$. Optical signal 311 (e.g., PREFNC) is a reference optical signal having a reference power signal equal to zero. Since optical signal 308 is generated based on digital signal 306, optical signal 310, and optical signal 311, optical signal 308 has a power that depends on digital signal 306, optical signal 310, optical signal 311, or a combination thereof. For example, digital signal 306 may vary an amplitude, frequency, phase, polarization, or a combination thereof of optical signal 310 and/or optical signal 311. For example, a power of optical signal 308 (e.g., $P_{out-N}$) can be given by $V_{out-N}*(\frac{1}{2}^N)*(P_{max}/K)$. In some embodiments, a power of optical signal 310 is the same as a power of optical signal 302 (e.g., PREFNB=PREFNA). In such embodiments, optical signal 310 can be the same as optical signal 302 (e.g., the same light beam can be input into photodetector 292 and optical switch 296). In some embodiments, a power of optical signal 310 is different than a power of optical signal 302-292.

In some embodiments, digital signal 152 is provided to and/or processed by an electrical signal process circuit 320. In some embodiments, electrical signal process circuit 320 includes and/or forms a portion of a DSP, such as DSP 64. In some embodiments, electrical signal process circuit 320 processes digital signal 152 to generate eye diagrams. In some embodiments, electrical signal process circuit 320 includes an oscilloscope, which can be used to analyze digital signal 152 and/or generate diagrams from digital signal 152.

In some embodiments, optical signal 154 is provided to and/or processed by an optical signal process circuit 325, respectively. In some embodiments, optical signal process circuit 325 includes and/or forms a portion of an optical combiner, which can be used to combine optical signal 154 and/or optical bits thereof with other optical signals. In some embodiments, optical signal process circuit 325 processes optical signal 154 to calibrate optical signals of optical ADC 150 (e.g., optical reference signals thereof and/or output signals (e.g., $P_{out-1} \ldots P_{out-N}$) thereof), optical signals of an optical communication system 10 (e.g., optical signal 35), optical signals generated by transmitter 15, other optical signals, or a combination thereof. In some embodiments, optical signal process circuit 325 processes and/or analyzes optical signal 154 to calibrate circuitry used to generate, process, transmit, receive, modulate, etc. optical signals of optical ADC 150, optical receiver 200, optical communication system 10 (including transmitter 15, communication path 25, and receiver 20), or a combination thereof.

Figure 6:
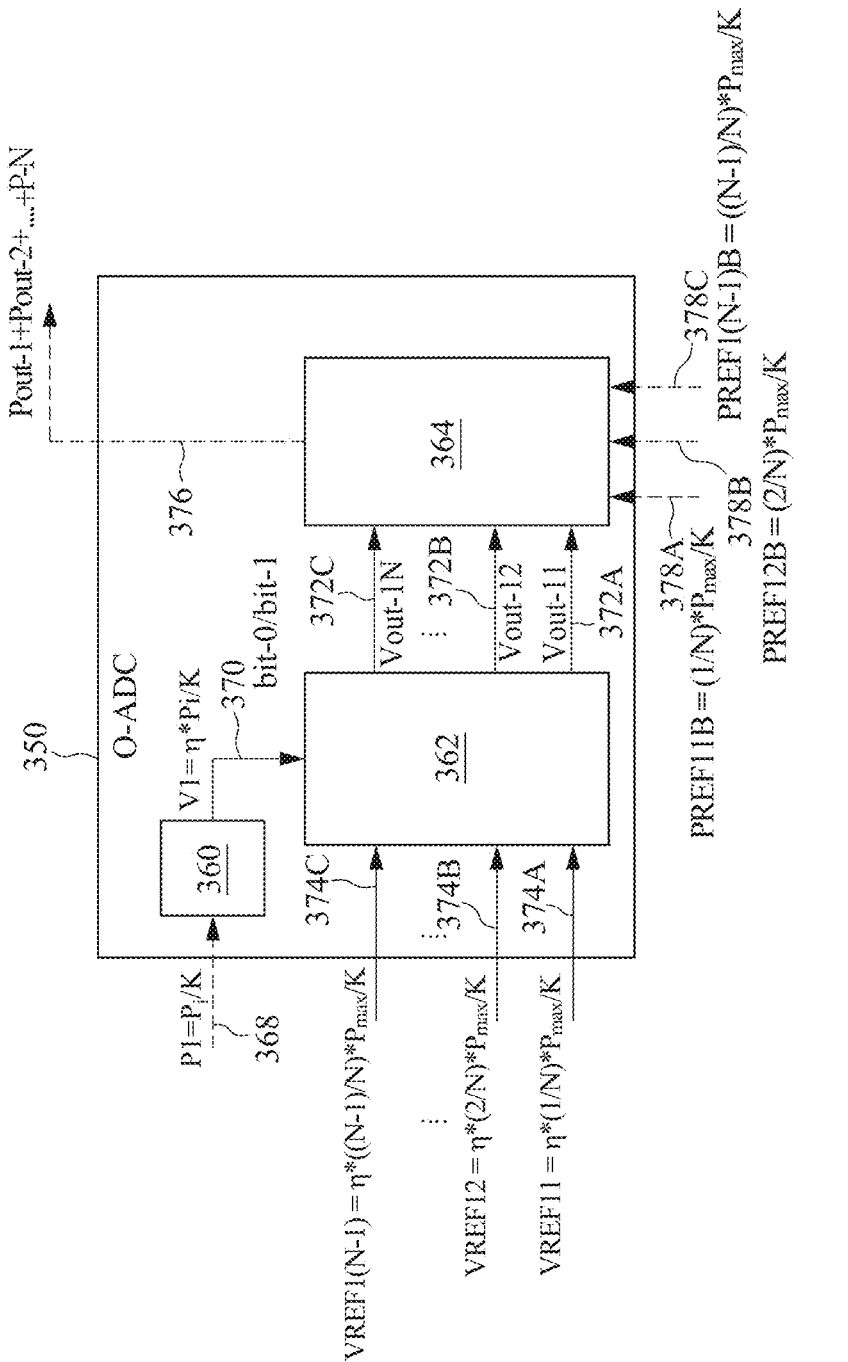
FIG. 6 is a block diagram of an optical analog-to-digital converter, in portion or entirety, according to various aspects of the present disclosure.

FIG. 6 is a block diagram of an optical ADC 350, in portion or entirety, according to various aspects of the present disclosure. Optical ADC 350 can be implemented in optical communication system 10, such as implemented as optical ADC 70 and/or a portion thereof, and/or as optical ADC 150 and/or a portion thereof in FIG. 3 and FIG. 4. Optical ADC 350 provides a multibit optical signal (e.g., $P_{out-1}+P_{out-2}+ \ldots +P_{out-N}$) based on a multibit digital electrical signal (e.g., $V_{out-1}-V_{out-N}$, respectively) and an optical reference signal. For example, ADC 350 converts an optical output signal into a respective multibit digital electrical signal (e.g., $V_{out-1}-V_{out-N}$, respectively) and produces a respective multibit optical signal (e.g., $P_{out-1}-P_{out-N}$, respectively) based on the multibit digital electrical signal. FIG. 6 has been simplified for the sake of clarity to better understand the inventive concepts of the present disclosure. Additional features can be added in optical ADC 350, and some of the features described below can be replaced, modified, or eliminated in other embodiments of optical ADC 350.

In FIG. 6, optical ADC 350 includes a photodetector 360, an ADC 362, and an optical multiplexer 364. Photodetector 360 converts an optical signal 368 into an analog signal 370, which represents a signal level of an optical input signal. For example, optical signal 368 (e.g., P) is a portion of optical input signal $OI_1$ having a power signal level (e.g., a power given by $P_i/K$), which is converted into analog signal 370. Analog signal 370 (e.g., V1) has a voltage signal level based on the power signal level (e.g., V1=η\*PD1=η\*($P_i/K$)).

ADC 362 is coupled to photodetector 360 and optical multiplexer 364. ADC 362 generates a multibit digital signal by comparing analog signal 370 to one or more reference analog signals, which can provide different quantization levels of the digital signal. For example, ADC 362 may generate an N-bit signal that includes a digital signal 372A (e.g., $V_{out-11}$), a digital signal 372B (e.g., $V_{out-12}$), . . . to a digital signal 372C (e.g., $V_{out-1N}$) by comparing analog signal 370 to reference analog signals, such as an analog signal 374A (e.g., VREF11), an analog signal 374B (VREF12), . . . to an analog signal 374C (e.g., VREF1(N–1)). The reference analog signals have voltage level signals based on different reference power signals of a reference optical signal. Where the reference optical signal is a portion of a maximum power optical signal (e.g., $P_{max}/K$), the reference power signals can be different percentages of the portion of the maximum power optical signal. For example, analog signal 374A may have a voltage signal level based on a power signal level of an optical signal having a power given by 1/N of a portion of $P_{max}$ (e.g., VREF11= η\*(1/N)\*($P_{max}/K$)), analog signal 374B may have a voltage signal level based on a power signal level of an optical signal having a power given by 2/N of a portion of $P_{max}$ (e.g., VREF12=η\*(2/N)\*($P_{max}/K$)), and analog signal 374C may have a voltage signal level based on a power signal level of an optical signal having a power given by (N–1)/N of a portion of $P_{max}$ (e.g., VREF1(N–1)=f\*((N–1)/N)\*($P_{max}/K$)). In some embodiments, ADC 362 is provided with three reference analog signals (e.g., analog signals 374A-374C). In some embodiments, more or less reference analog signals are provided to ADC 362 for generating digital signals. In some embodiments, quantization levels (i.e., analog signals 374A-374C) are preset, predefined reference analog signals, such as by presetting/predefining $P_{max}$ and various percentages thereof. In some embodiments, ADC 362 is a comparator. In some embodiments, ADC 362 is a Schmitt trigger. In some embodiments, the multibit digital signal generated by ADC 362 may be a telecommunication signal of $^{N}\sqrt{2}$, which may be selected and added by optical multiplexer 364. In some embodiments, ADC 362 may include multiple stages configured to generate the multibit digital signal. Various ADC circuit configurations are contemplated for realizing ADC 362 and generation of its multibit digital signal.

ADC 362 provides its multibit digital signal (e.g., V provided by digital signal 372A (e.g., $V_{out-11}$), digital signal 372B (e.g., $V_{out-12}$), . . . to digital signal 372C (e.g., $V_{out-1N}$)), to optical multiplexer 364, which generates an optical signal 376 (e.g., $P_{out-1}+P_{out-2} \ldots +P_{out-N}$). In the depicted embodiment, optical signal 376 is an N-bit optical signal. Optical signal 376 is generated based on digital signal 372A, digital signal 372B, . . . to digital signal 372C and one or more optical signals, such as an optical signal 378A, an optical signal 378B, . . . to an optical signal 378C, which can provide different quantization levels of optical signal 376. For example, optical multiplexer 364 receives optical signal 378A, optical signal 378B, and optical signal 378C, modulates optical signal 378A based on one or more of digital signals 372A-372C (e.g., $V_{out-11}-V_{out-1N}$), modulates optical signal 378B based on one or more of digital signals 372A-372C, modulates optical signal 378C based on one or more of digital signals 372A-372C, and merges and/or combines modulated optical signals 378A-378C to provide optical signal 376. Optical signal 378A (e.g., PREF11B), optical signal 378B (e.g., PREF12B), and optical signal 378C (e.g., PREF1(N–1)B) are reference optical signals having a reference power signal level that is less than $P_{max}$. For example, optical signal 378A is a portion of a maximum power optical signal, such as an optical signal having a power given by (1/N)\*($P_{max}/K$), optical signal 378B is a portion of a maximum power optical signal, such as an optical signal having a power given by $(2/N)*(P_{max}/K)$, and optical signal 378C is a portion of a maximum power optical signal, such as an optical signal having a power given by $((N-1)/N)*(P_{max}/K)$. Since optical signal 376 is generated based on digital signals 372A-372C and optical signals 378A-378C, optical signal 376 has a power that depends on one or more of digital signals 372A-372C and/or optical signals 378A-378C. For example, digital signal 372A, digital signal 372B, digital signal 378C, or a combination thereof may vary an amplitude, frequency, phase, polarization, or a combination thereof of optical signal 378A, optical signal 378B, optical signal 378C, or a combination thereof. In some embodiments, optical multiplexer 364 may be an N-bit electro-optical converter that is configured to convert the multibit digital signal (i.e., N-bit electrical signals represented by N decoded bits given by $V_{out1k}$ (where $k=1, 2, \ldots, N$)) into the multibit optical signal (e.g., optical signal 376), which is a combination of N-bit optical signals.

Figure 7:
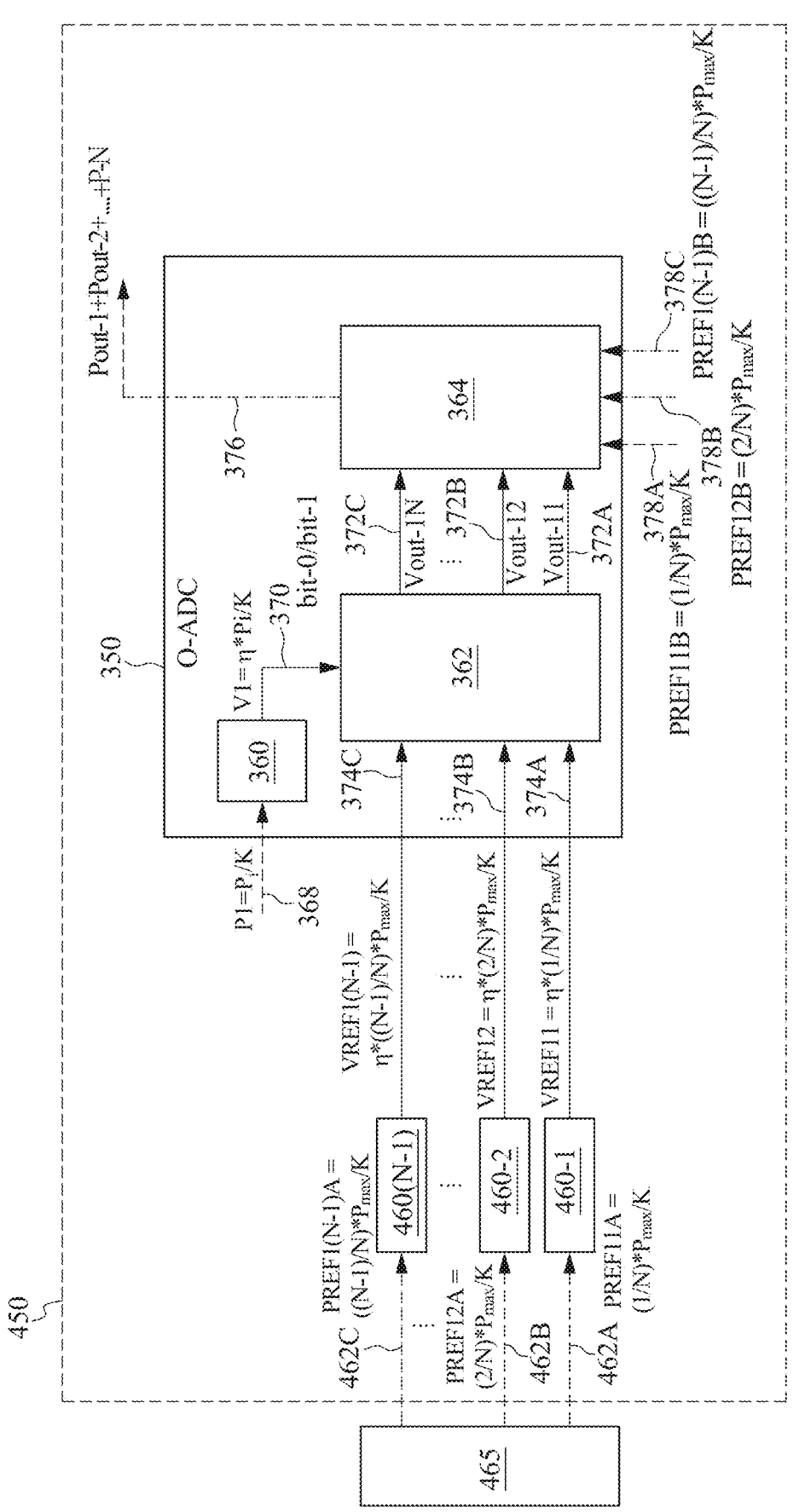
FIG. 7 is a block diagram of an optical analog-to-digital converter, in portion or entirety, according to various aspects of the present disclosure.

FIG. 7 is a block diagram of an optical ADC 450, in portion or entirety, according to various aspects of the present disclosure. Optical ADC 450 can be implemented in optical communication system 10, such as implemented as optical ADC 70 and/or a portion thereof, and/or as optical ADC 150 and/or a portion thereof in FIG. 3 and/or FIG. 4. Optical ADC 450 is configured to adaptively adjust quantization levels of digital signals generated by optical ADC 350. For example, optical ADC 350 further includes a photodetector 460-1, a photodetector 460-2, . . . to a photodetector 460-(N-1), each of which is coupled to ADC 362. Photodetector 460-1 converts an optical signal 462A into analog signal 374A, photodetector 460-2 converts an optical signal 462B into analog signal 374B, and photodetector 460-(N-1) converts an optical signal 462C into analog signal 374C. Optical signal 462A (e.g., PREF11A), optical signal 462B (e.g., PREF12A), and optical signal 462C (e.g., PREF1(N-1)A) are reference optical signals having reference power signal levels that are less than $P_{max}$, such as a power given by $(1/N)*(P_{max}/K)$, a power given by $(2/N)*(P_{max}/K)$, and a power given by $((N-1)/N)*(P_{max}/K)$, respectively. In some embodiments, an optical power splitter 465 receives a maximum power output signal from a transmitter, such as transmitter 15, and divides the maximum power output signal by a number of channels of optical ADC 450 (here, K) and/or according to a desired power split ratio for providing desired quantization levels. In such embodiments, optical splitter 465 can be coupled to an optical source (e.g., a laser) of a transmitter, and photodetectors 460-1-460-(N-1) can receive optical signals 462A-462C, respectively, from optical splitter 465, such that the quantization levels are adapted as $P_{max}$ of the transmitter's optical source changes. In some embodiments, the maximum power optical signal is transmitted to a receiver including optical ADC 450, such as receiver 20 and/or optical receiver 200, through a calibration channel, which may be a waveguide and/or other optical media. FIG. 7 has been simplified for the sake of clarity to better understand the inventive concepts of the present disclosure. Additional features can be added in optical ADC 450, and some of the features described below can be replaced, modified, or eliminated in other embodiments of optical ADC 450.

Figures 8A, 8B:
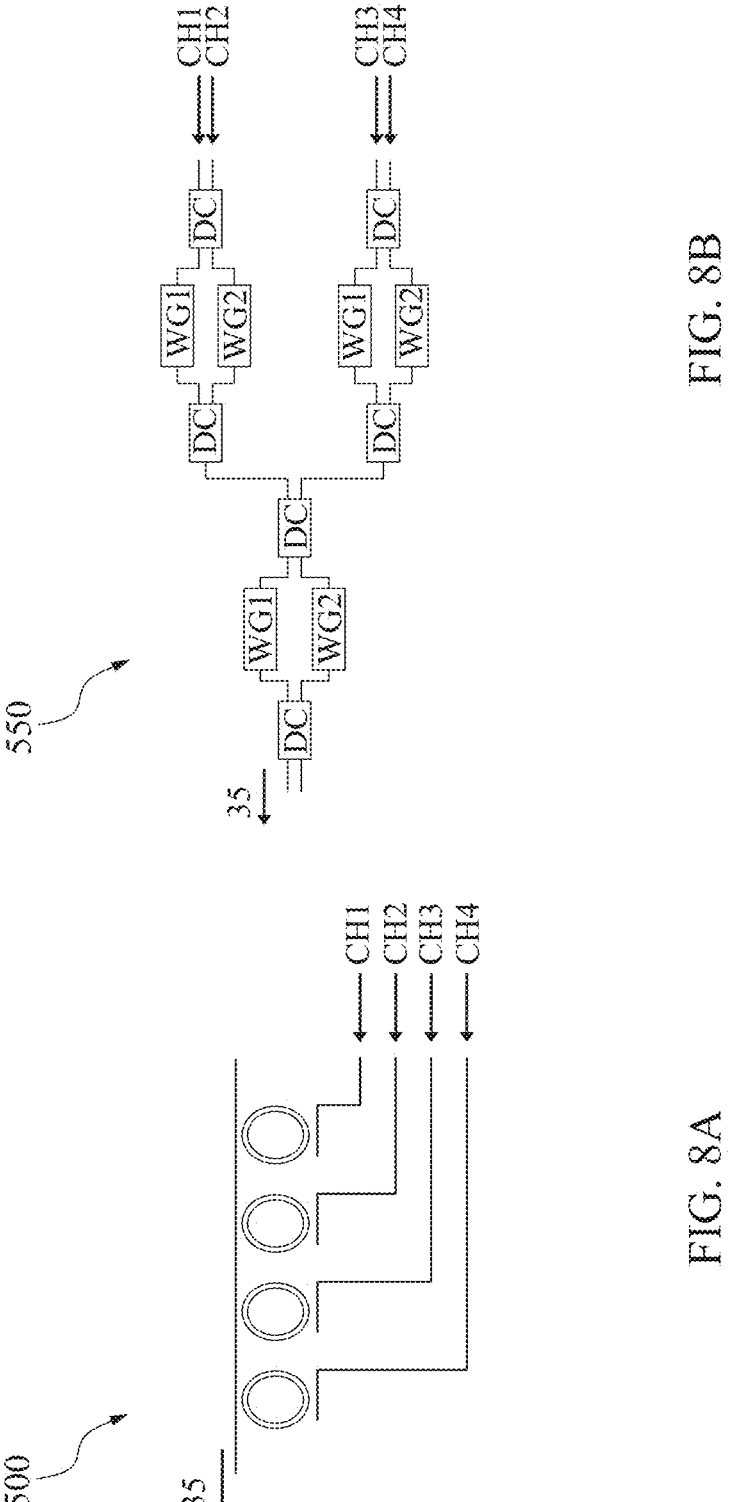
FIG. 8A and FIG. 8B are schematic representations of multiplexers, in portion or entirety, according to various aspects of the present disclosure.
Figures 9A, 9B:
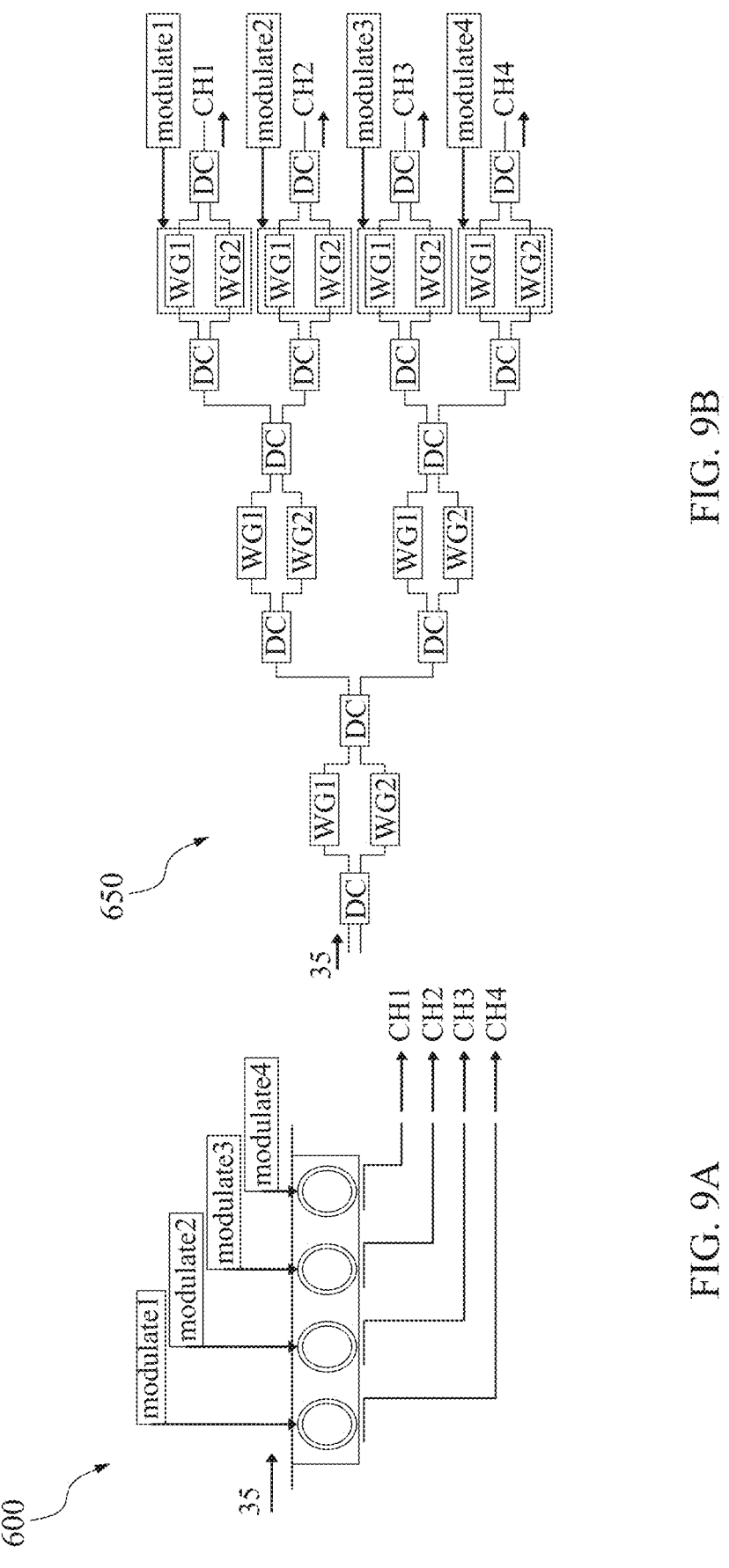
FIG. 9A and FIG. 9B are schematic representations of multiplexers, in portion or entirety, according to various aspects of the present disclosure.
Figure 10:
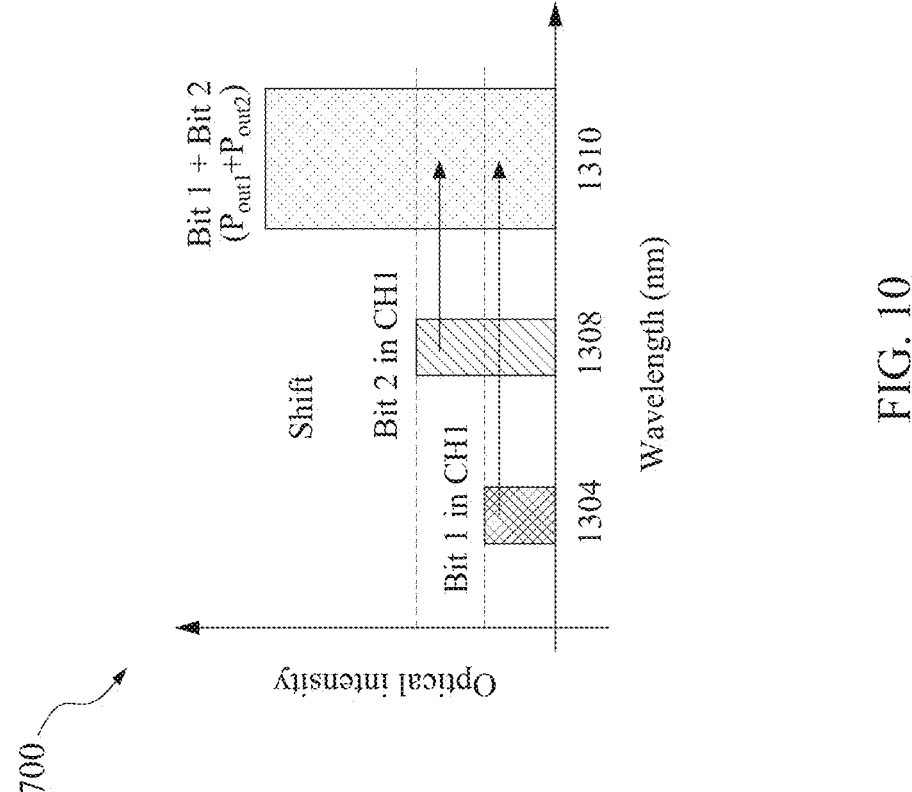
FIG. 10 is a plot of optical intensity as a function of optical wavelength, in portion or entirety, according to various aspects of the present disclosure.

Optical multiplexers and/or optical demultiplexers described herein can have various configurations. Turning to FIG. 8A and FIG. 8B, in some embodiments, transmitter 15 includes a multiplexer configured to combine optical signals having different wavelengths (e.g., optical signals $O_{1M}$-$O_{MM}$) into a single optical signal for transmission (e.g., optical signal 35). The multiplexer may be configured as a ring resonator 500, such as depicted in FIG. 8A, or as a Mach-Zehnder interferometer (MZI) 550, such as depicted in FIG. 8B. Turning to FIG. 9A and FIG. 9B, in some embodiments, receiver 20 includes a demultiplexer configured to separate a single optical signal (e.g., optical signal 35) into optical signals having different wavelengths (i.e., separate optical signals having different wavelengths (bands) into different channels. The demultiplexer may be configured as a ring resonator 600, such as depicted in FIG. 9A, or as an MZI 650, such as depicted in FIG. 9B. In FIG. 9A, ring resonator 600 includes modulator rings (e.g., a modulator 1, a modulator 2, a modulator 3, a modulator 4, etc.) that receive an input signal, such as optical signal 35, and separate optical signal 35 into corresponding channels (e.g., CH1, CH2, CH3, CH4, etc.) by phase modulation through electrical signals. Ring resonator 500 may operate in reverse, for example, by modulator rings (e.g., a modulator 1, a modulator 2, a modulator 3, a modulator 4, etc.) receiving optical signals from respective channels (e.g., CH1, CH2, CH3, CH4, etc.) and combining the optical signals into a single output optical signal, such as optical signal 35, by phase modulation through electrical signals. In FIG. 9B, MZI 650 includes directional couplers (DC) and pairs of waveguides (e.g., WG1 and WG2) configured to receive an input signal, such as optical signal 35, and separate optical signal 35 (e.g., by phase modulation through electrical signals) into corresponding channels (e.g., CH1, CH2, CH3, CH4, etc.). Each pair of waveguides is coupled to a pair of directional couplers, such as a directional coupler coupled to inputs of a pair of waveguides and a directional coupler coupled to outputs of the pair of waveguides. MZI resonator 550 may operate in reverse.

Where optical signals have multiple bits, such as where an optical signal carries information of bit data located in different wavelengths, wavelengths of optical signals can be shifted to an optical transmission wavelength by heating and combining the optical signals. For example, turning to FIG. 10, which provides a plot 700 that illustrates optical intensity as a function of optical signal wavelength, where a first optical signal carrying a first bit (e.g., Bit 1 ($P_{out-1}$)) in a first channel (e.g., CH1) has a first wavelength (e.g., 1304 nm) and a corresponding first optical intensity and a second optical signal carrying a second bit (e.g., Bit 2 ($P_{out-2}$)) in a second channel (e.g., CH2) has a second wavelength (e.g., 1308 nm) and a corresponding second optical intensity, the first optical signal and the second optical signal can be heated to shift and combine them into an optical signal that carries the first bit and the second bit (e.g., Bit 1+Bit 2 ($P_{out-1}+P_{out-2}$)). The optical signal that carries the first bit and the second bit has a corresponding optical transmission wavelength (e.g., 1310 nm), which may have an optical intensity that is greater than the first optical intensity of the first optical signal/first wavelength and/or the second optical intensity of the second optical signal/second wavelength. The optical transmission wavelength may be greater than the first wavelength and/or the second wavelength. FIG. 10 has been simplified for the sake of clarity to better understand the inventive concepts of the present disclosure. Additional features can be added in plot 700, and some of the features described below can be replaced, modified, or eliminated in other embodiments of plot 700.

Figure 11:
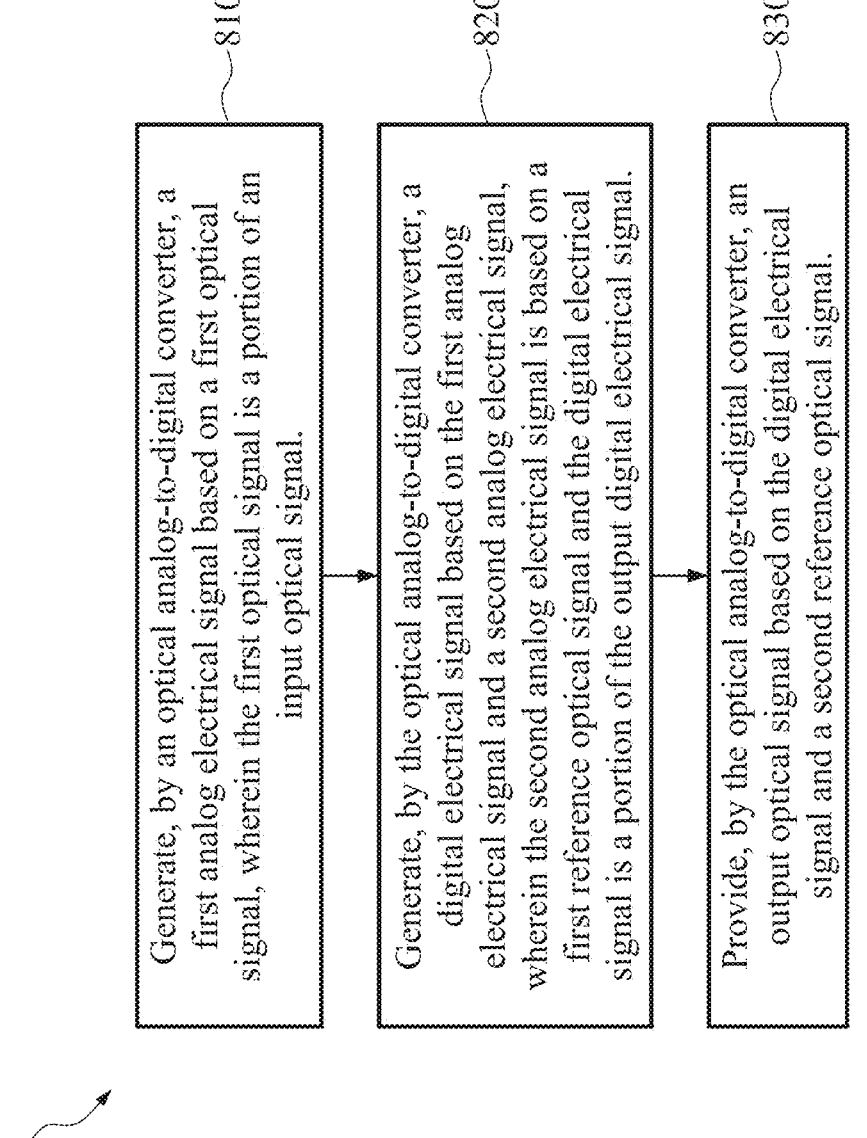
FIG. 11 is a flow chart of an optical analog-to-digital conversion method, in portion or entirety, according to various aspects of the present disclosure.

FIG. 11 is a flow chart of a method 800, in portion or entirety, for converting an input optical signal into an output digital electrical signal, according to various aspects of the present disclosure. Method 800 at block 810 can include generating, by an optical analog-to-digital converter, a first analog electrical signal based on a first optical signal. The first optical signal is a portion of the input optical signal. Method 800 at block 820 can include generating, by the optical analog-to-digital converter, a digital electrical signal based on the first analog electrical signal and a second analog electrical signal. The second analog electrical signal is based on a first reference optical signal, and the digital electrical signal is a portion of the output digital electrical signal. Method 800 at block 830 can include providing, by the optical analog-to-digital converter, an output optical signal based on the digital electrical signal and a second reference optical signal. FIG. 11 has been simplified for the sake of clarity to better understand the inventive concepts of the present disclosure. Additional steps can be provided before, during, and after method 800, and some of the steps described can be moved, replaced, or eliminated for additional embodiments of method 800.

Optical analog-to-digital converters (O-ADCs) are disclosed herein. An exemplary optical analog-to-digital converter (O-ADC) converts an input optical signal (IOS) into an output digital signal. The O-ADC includes ADC stages, each of which can generate an electrical bit of the output digital signal and an optical bit. An ADC stage can include a photodetector, an ADC circuit, and an optical output circuit. The photodetector generates an analog electrical signal based on a portion of the IOS. The ADC circuit generates a digital electrical signal (electrical bit) based on the analog electrical signal and a reference analog electrical signal, which is based on a portion of a reference optical signal (ROS). The optical output circuit provides an output optical signal (OOS) (optical bit) based on the digital electrical signal and the portion of the ROS. Photodetectors of subsequent ADC stages generate analog electrical signals based further on an OOS from an optical output circuit of a previous respective ADC stage.

An exemplary optical analog-to-digital converter include an optical-to-electrical conversion circuit, an analog-to-digital conversion circuit, and an optical output circuit. The analog-to-digital converter is configured to receive a first optical signal and generate a first analog electrical signal based on the first optical signal. The first optical signal is a portion of an input optical signal. The analog-to-digital conversion circuit is configured to receive the first analog electrical signal and a second analog electrical signal and generate a digital electrical signal based on the first analog electrical signal and the second analog electrical signal. The second analog electrical signal is based on a second optical signal, and the digital electrical signal is a portion of an output digital signal. The optical output circuit is configured to receive the digital electrical signal and a third optical signal and provide an output optical signal based on the digital electrical signal and the third optical signal.

In some embodiments, the optical-to-electrical conversion circuit is a first optical-to-electrical conversion circuit, and the optical analog-to-digital converter further includes a second optical-to-electrical conversion circuit configured to receive the first optical signal and generate the second analog electrical signal based on the second optical signal. The second optical signal is a portion of a reference optical signal. In some embodiments, the reference optical signal is a maximum power optical signal. In some embodiments, the optical analog-to-digital converter is a first optical analog-to-digital converter, the output optical signal is a first optical output signal, and the second optical-to-electrical conversion circuit is configured to receive a second optical output signal from a second optical analog-to-digital converter and generate the second analog electrical signal based on the second optical signal and the second output optical signal.

In some embodiments, the second optical signal is a first portion of a reference optical signal, the third optical signal is a second portion of the reference optical signal, and the reference optical signal is a maximum power optical signal. In some embodiments, a first signal level of the first portion of the reference optical signal is the same as a second signal level of the second portion of the reference optical signal.

In some embodiments, the optical analog-to-digital converter is part of a cascade of optical analog-to-digital converters configured to generate the output digital signal having N-bits. N is a number of bits of the output digital signal, N is an integer, and N is greater than one. The digital electrical signal provides a kth bit of the output digital signal. k is an integer and k=1, . . . to N. The input optical signal has an input power ($P_i$) and the first optical signal has a first power that is a portion of the input power ($P_i$). The second optical signal is a portion of a reference optical signal, the reference optical signal has a reference power, and the second optical signal has a second power that is a portion of the reference power. In some embodiments, the optical-to-electrical conversion circuit is configured to receive the first optical signal from an optical power splitter having K channels. K is an integer. The reference power is a maximum power ($P_{max}$). The first power of the first optical signal is given by $P_i/K$. The second power of the second optical signal is given by $(\frac{1}{2}^k)*(P_{max}/K)$.

In some embodiments, the analog-to-digital conversion circuit is configured to receive a third analog electrical signal and generate the digital electrical signal based on the first analog electrical signal, the second analog electrical signal, and the third analog electrical signal. The third analog electrical signal is based on the second optical signal and a signal level of the second analog electrical signal is different than a signal level of the third analog electrical signal. In some embodiments, the optical output circuit is configured to receive a fourth optical signal and provide the output optical signal based on the digital electrical signal, the third optical signal, and the fourth optical signal. A signal level of the third optical signal is different than a signal level of the fourth optical signal.

In some embodiments, the optical output circuit is a 2×1 optical switch. In some embodiments, the optical output circuit is an optical multiplexer.

An exemplary optical analog-to-digital converter is configured to convert an input optical signal into an output digital electrical signal. The optical analog-to-digital converter includes a first optical analog-to-digital stage having a first photodetector, a first analog-to-digital conversion circuit, and a first optical output circuit. The first photodetector is configured to generate a first analog electrical signal based on a first portion of the input optical signal. The first analog-to-digital conversion circuit is configured to generate a first digital electrical signal based on the first analog electrical signal and a first reference analog electrical signal. The first reference analog electrical signal is based on a first portion of a first reference optical signal. The first optical output circuit is configured to provide a first output optical signal based on the first digital electrical signal and a first portion of a second reference optical signal.

The optical analog-to-digital converter further includes a second optical analog-to-digital converter stage having a second photodetector, a second analog-to-digital conversion circuit, and a second optical output circuit. The second photodetector is configured to generate a second analog electrical signal based on a second portion of the input optical signal and the first output optical signal. The second analog-to-digital conversion circuit is configured to generate a second digital electrical signal based on the second analog electrical signal and a second reference analog electrical signal. The second reference analog electrical signal is based on a second portion of the first reference optical signal. The second optical output circuit is configured to provide a second output optical signal based on the second digital electrical signal and a second portion of the second reference optical signal.

In some embodiments, the first photodetector and the second photodetector receive the first portion of the input optical signal and the second portion of the input optical signal from an optical power splitter having K channels. K is an integer, the input optical signal has an input power ($P_i$), and the first portion of the input optical signal and the second portion of the input optical signal each have a power given by $P_i/K$.

In some embodiments, the first reference optical signal is a maximum power optical signal, the maximum power optical signal has a maximum power (Pmax), and the first portion of the first reference optical signal has a first reference power given by a first percentage of Pmax/K and the second portion of the first reference optical signal has a second reference power given by a second percentage of Pmax/K, wherein the first percentage of $P_{max}/K$ is different than the second percentage of Pmax/K.

In some embodiment, the output digital electrical signal has N-bits. N is a number of bits of the output digital electrical signal, N is an integer, and N is greater than one. The first digital electrical signal generated by the first analog-to-digital conversion circuit is a kth bit of the output digital electrical signal and the second digital electrical signal generated by the second analog-to-digital conversion circuit is a (k+1)th bit of the output digital electrical signal. k is an integer and k=1, . . . to N. The first reference power of the first portion of the first reference optical signal is given by $(1/2^k)*(P_{max}/K)$ and the second reference power of the second portion of the first reference optical signal is $(1/2^{(k+1)})*(P_{max}/K)$.

In some embodiments, the first reference optical signal and the second reference optical signal are the same. In some embodiments, a power of the first portion of the first reference optical signal is greater than a power of the second portion of the first reference optical signal, and a power of the first portion of the second reference optical signal is greater than a power of the second portion of the second reference optical signal.

An exemplary method for converting an input optical signal into an output digital electrical signal includes generating, by an optical analog-to-digital converter, a first analog electrical signal based on a first optical signal. The first optical signal is a portion of the input optical signal. The method further includes generating, by the optical analog-to-digital converter, a digital electrical signal based on the first analog electrical signal and a second analog electrical signal. The second analog electrical signal is based on a first reference optical signal and the digital electrical signal is a portion of the output digital electrical signal. The method further includes providing, by the optical analog-to-digital converter, an output optical signal based on the digital electrical signal and a second reference optical signal.

In some embodiments, the first reference optical signal and the second reference optical signal are the same. In some embodiments, the optical analog-to-digital converter is a first optical analog-to-digital converter, and the output optical signal is a first output optical signal. In such embodiments, the method can further include generating the first analog electrical signal based on the first optical signal and a second output optical signal received from a second optical analog-to-digital converter.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical analog-to-digital converter comprising:
   a first optical-to-electrical conversion circuit and a second optical-to-electrical conversion circuit, wherein the first optical-to-electrical conversion circuit converts an first optical signal into a first analog electrical signal and the second optical-to-electrical conversion circuit converts a second optical signal into a second analog electrical signal, wherein the first optical signal is a portion of an input optical signal and the second optical signal is a portion of a first reference optical signal;
   a comparator circuit coupled to the first optical-to-electrical conversion circuit and the second optical-to-electrical conversion circuit, wherein the comparator circuit generates a digital electrical signal by comparing the first analog electrical signal and the second analog electrical signal; and
   an optical output circuit coupled to the comparator circuit, wherein the optical output circuit generates an output optical signal by modulating a second reference optical signal based on the digital electrical signal.

2. The optical analog-to-digital converter of claim 1, wherein the optical output circuit is coupled to a third optical-to-electrical conversion circuit, wherein the third optical-to-electrical conversion circuit generates a third analog signal using the output optical signal.

3. The optical analog-to-digital converter of claim 1, wherein:
   the first reference optical signal is a maximum power optical signal and the second optical signal is a portion of the maximum power optical signal;
   the digital electrical signal is a k bit of an N-bit digital signal, wherein N is an integer, k is an integer, N is greater than one, and k=1; and
   the first optical signal is 1/N of the input optical signal.

4. The optical analog-to-digital converter of claim 1, wherein the second optical reference signal has a first signal level or a second signal level that is less than the first signal level, wherein the first signal level is less than a maximum optical signal level.

5. The optical analog-to-digital converter of claim 1, wherein a first magnitude of the first reference optical signal is different than a second magnitude of the second reference optical signal.

6. The optical analog-to-digital converter of claim 1, wherein a first magnitude of the first reference optical signal is the same as a second magnitude of the second reference optical signal.

7. The optical analog-to-digital converter of claim 1, wherein the digital electrical signal provides one bit of an N-bit digital signal, wherein N is a total number of bits, N is an integer, and N is greater than one.

8. The optical analog-to-digital converter of claim 1, wherein:

the first optical-to-electrical conversion circuit is coupled to an optical power splitter having K channels, wherein K is an integer;

the input optical signal has an input power ($P_i$);

the first reference optical signal has a maximum power ($P_{max}$);

a first power of the first optical signal is given by $P_i/K$; and a second power of the second optical signal is given by $(1/2^k)*(P_{max}/K)$.

9. The optical analog-to-digital converter of claim 1, wherein the second optical signal has a signal level that is less than a maximum optical signal level.

10. The optical analog-to-digital converter of claim 1, wherein the optical output circuit is a 2×1 optical switch, wherein the 2×1 optical switch receives a first input optical signal on a first input and receives a second input optical signal on a second input, and further wherein the output optical signal generated by modulating the second reference optical signal based on the digital electrical signal is the first input optical signal or the second input optical signal modulated based on the digital electrical signal.

11. The optical analog-to-digital converter of claim 10, wherein a first power of the first input optical signal is less than a second power of the second input optical signal.

12. An optical analog-to-digital converter for converting an input optical signal into an output digital electrical signal, the optical analog-to-digital converter comprising:

a first optical analog-to-digital converter stage having a first photodetector, a first comparator, and a first optical switch, wherein:

the first photodetector converts a first portion of the input optical signal into a first analog electrical signal, the first comparator generates a first digital electrical signal by comparing the first analog electrical signal and a first reference analog electrical signal, and the first optical switch outputs a first output optical signal based on the first digital electrical signal;

a second optical analog-to-digital converter stage having a second photodetector, a second comparator, and a second optical switch, wherein:

the second photodetector generates a second analog electrical signal based on a difference between a second portion of the input optical signal and the first output optical signal, the second comparator generates a second digital electrical signal by comparing the second analog electrical signal and a second reference analog electrical signal, the second optical switch outputs a second output optical signal based on the second digital electrical signal; and wherein the output digital electrical signal is an N-bit digital signal, the first digital electrical signal is a k bit of the N-bit digital signal, the second digital electrical signal is a (k+1) bit of the N-bit digital signal, N and k are integers, N is greater than one, and k is less than N.

13. The optical analog-to-digital converter of claim 12, wherein:

the first photodetector and the second photodetector receive the first portion of the input optical signal and the second portion of the input optical signal, respectively, from an optical power splitter having K channels, wherein K is an integer;

the input optical signal has an input power ($P_i$); and each of the first portion of the input optical signal and the second portion of the input optical signal has a power given by $P_i/K$.

14. The optical analog-to-digital converter of claim 12, wherein:

the first optical analog-to-digital converter stage further has a third photodetector that converts a first reference optical signal into the first reference analog electrical signal, wherein the first reference optical signal has a first magnitude; and the second optical analog-to-digital converter stage further has a fourth photodetector that converts a second reference optical signal into the second reference analog electrical signal, wherein the second reference optical signal has a second magnitude that is less than the first magnitude.

15. The optical analog-to-digital converter of claim 14, wherein:

a maximum power optical signal has a maximum power ($P_{max}$);

an input power of the input optical signal is less than the maximum power; and a first reference power of the first portion of the first reference optical signal is given by $(1/2^k)*(P_{max}/K)$ and a second reference power of the second reference optical signal is $(1/2^{(k+1)})*(P_{max}/K)$.

16. The optical analog-to-digital converter of claim 12, wherein:

the first optical switch includes receives a first reference optical signal and a second reference optical signal, wherein the first reference optical signal has a first magnitude and the second reference optical signal has a second magnitude greater than the first magnitude; and the second optical switch includes receives a third reference optical signal and a fourth reference optical signal, wherein the third reference optical signal has a third magnitude and the fourth reference optical signal has a fourth magnitude greater than the second magnitude and less than the second magnitude.

17. The optical analog-to-digital converter of claim 16, wherein:

a maximum power optical signal has a maximum power ($P_{max}$);

an input power of the input optical signal is less than the maximum power;

a first reference power of the second reference optical signal is given by $(1/2^k)*(P_{max}/K)$;

a second reference power of the first reference optical signal is the same as a third reference power of the third reference optical signal; and a fourth reference power of the fourth reference optical signal is given by $(1/2^{(k+1)})*(P_{max}/K)$.

18. A method for converting an input optical signal into an output digital electrical signal, the method comprising:

converting, by a first optical-to-electrical conversion circuit of an optical analog-to-digital converter, a first optical signal into a first analog electrical signal, wherein the first optical signal is a portion of the input optical signal;

converting, by a second optical-to-electrical conversion circuit of the optical analog-to-digital converter, a second optical signal into a second analog electrical signal, wherein the second optical signal is a portion of a first reference optical signal;

generating, by a comparator circuit of the optical analog-to-digital converter coupled to the first optical-to-electrical conversion circuit and the second optical-to-electrical conversion circuit, a digital electrical signal by comparing the first analog electrical signal and the second analog electrical signal; and generating, by an optical output circuit of the optical analog-to-digital converter coupled to the comparator circuit, an output optical signal by modulating a second reference optical signal based on the digital electrical signal.

19. The method of claim 18, wherein a first magnitude of the first reference optical signal and a second magnitude of the second reference optical signal are the same.

20. The method of claim 18, further comprising receiving, by the first optical-to-electrical conversion circuit of the optical analog-to-digital converter, the first optical signal from an optical power splitter having K channels, wherein K is an integer, the input optical signal has an input power ($P_i$), and the first optical signal has a power given by $P_i/K$.

* * * * *